(12) United States Patent
Debray et al.

(10) Patent No.: US 10,273,904 B2
(45) Date of Patent: Apr. 30, 2019

(54) FAIRING FOR A MIXER OF A NOZZLE OF A DUAL-FLOW TURBOMACHINE

(71) Applicant: SNECMA, Paris (FR)

(72) Inventors: Benoit Argemiro Matthieu Debray, Moissy-Cramayel (FR); Mario Cesar De Sousa, Moissy-Cramayel (FR); Gregory Ghosarossian-Prillieux, Moissy-Cramayel (FR); Frederic Noel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 560 days.

(21) Appl. No.: 14/931,604

(22) Filed: Nov. 3, 2015

(65) Prior Publication Data

US 2016/0131077 A1    May 12, 2016

(30) Foreign Application Priority Data

Nov. 6, 2014 (FR) ..................... 14 60715

(51) Int. Cl.
*F02K 1/40* (2006.01)
*F01D 25/24* (2006.01)
(Continued)

(52) U.S. Cl.
CPC .............. *F02K 1/40* (2013.01); *F01D 25/243* (2013.01); *F02K 1/386* (2013.01); *F02K 1/48* (2013.01);
(Continued)

(58) Field of Classification Search
CPC ... F02K 1/386; F02K 1/40; F02K 1/46; F02K 1/48; F02K 1/38; F02K 1/383
See application file for complete search history.

(56) References Cited

U.S. PATENT DOCUMENTS 8,590,316 B2 * 11/2013 Conete .................... F02K 1/386
239/265.19
8,813,907 B2 * 8/2014 Tanaka ..................... F02C 6/08
181/213

FOREIGN PATENT DOCUMENTS

EP        0898071      2/1999
FR        2914955      10/2008
(Continued)

OTHER PUBLICATIONS

French Search Report, dated Jul. 8, 2015, French Application No. 1460715.

*Primary Examiner* — Arun Goyal
(74) *Attorney, Agent, or Firm* — Womble Bond Dickinson (US) LLP

(57) ABSTRACT

The invention relates to a fairing (37) for a mixer (28) of a nozzle (26) of a dual-flow turbomachine (20), said mixer being of an overall annular shape and extending along a longitudinal axis (24) of the turbomachine, said mixer comprising an upstream part (29) provided with a flange (31) extending radially toward the outside of the mixer, intended to be fastened to an exhaust casing (21) of the turbomachine, and a downstream part (33) forming a flow mixing area, the fairing (37) being of an overall annular shape and configured to extend around the upstream part (29) of the mixer (28) and to be attached to the flange (31) of said upstream part (29), the fairing being without means for fastening to the downstream part (33) of the mixer (28), in such a way as to connect the fairing (37) to the mixer (28) at a distance from the flow mixing area.

9 Claims, 5 Drawing Sheets

(51) Int. Cl.
*F02K 1/38* (2006.01)
*F02K 1/48* (2006.01)
*F02K 3/06* (2006.01)
*F02K 3/04* (2006.01)

(52) U.S. Cl.
CPC .............. *F02K 3/04* (2013.01); *F02K 3/06* (2013.01); *F05D 2230/232* (2013.01); *F05D 2250/311* (2013.01); *F05D 2260/941* (2013.01); *Y02T 50/671* (2013.01)

(56) References Cited

FOREIGN PATENT DOCUMENTS

| | | |
|---|---|---|
| FR | 2935753 | 3/2010 |
| GB | 2014665 | 8/1979 |

\* cited by examiner

FAIRING FOR A MIXER OF A NOZZLE OF A DUAL-FLOW TURBOMACHINE

GENERAL TECHNICAL FIELD

The present invention relates to the general field of dual-flow turbomachines. More precisely, the present invention relates to a fairing for a mixer of a nozzle of a dual-flow turbomachine.

PRIOR ART

A turbomachine generally comprises, from upstream to downstream, in the direction of flow of the gases, a fan, one or more stages of compressors, for example a high-pressure compressor and a low-pressure compressor, a combustion chamber, one or more turbine stages, for example a high-pressure turbine and a low-pressure turbine, and a gas exhaust casing to which an exhaust nozzle is connected.

Figure 1:
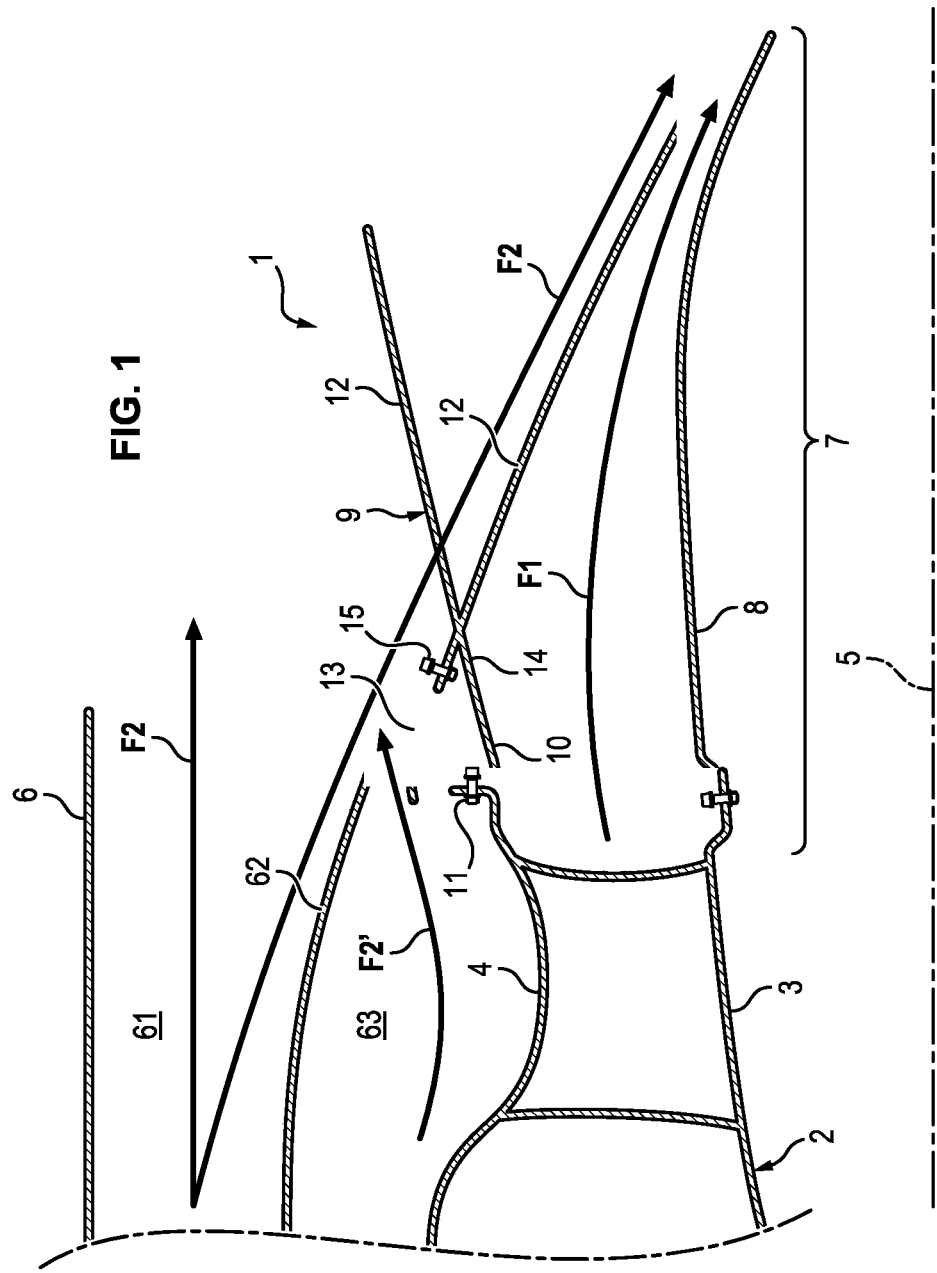

FIG. 1 illustrates a longitudinal section view of a dual-flow turbomachine 1 of the prior art.

The turbomachine 1 comprises an exhaust casing 2 delineated by annular inner 3 and outer 4 casings, extending one inside the other along a longitudinal axis 5 of the turbomachine 1, and between which a primary flow $F_1$ of gas runs. The exhaust casing 2 is surrounded by a nacelle 6 that forms with the outer casing 4 a duct 61 along which a secondary flow $F_2$ of gas runs. The exhaust casing 2 is further surrounded by an annular structure 62 provided between the nacelle 6 and the outer casing 4 so as to derive a secondary part $F_2'$ of the secondary flow $F_2$ toward a ventilation duct 63 formed between the outer casing 4 and the annular structure 62. This derived part $F_2'$ of the secondary flow $F_2$ is generally described as a ventilation flow of the nacelle 6.

Downstream the exhaust casing 2 is connected to an exhaust nozzle 7.

The exhaust nozzle 7 comprises a central body 8 or "plug" extending along the longitudinal axis 5 and having a downstream end of an overall conical shape. The central body 8 is connected to the inner casing 3.

The exhaust nozzle 7 further comprises a mixer 9 of an overall annular shape, extending along the longitudinal axis 5. The mixer 9 comprises an upstream part 10 provided with a flange 11 extending radially toward the outside of the mixer 9 and by which the mixer 9 is connected to the outer casing 4, as well as a downstream part 12 forming an area where the primary $F_1$ and secondary $F_2$ flows are mixed. The downstream part 12 is for example provided with lobes configured to favor the mixing of the primary $F_1$ and secondary $F_2$ flows.

The ventilation duct 63 sends the ventilation flow $F_2'$ back into the duct 61 into which the secondary flow $F_2$ runs, at the upstream part 10 of the mixer 9. In order to ensure the continuity of the secondary flow $F_2$ at the output of the ventilation duct 63, the mixer 9 is provided with a fairing 13. For this purpose, the fairing 13 has an overall annular shape extending along the longitudinal axis 5 around the upstream part 10 of the mixer 9 and is attached to the mixer 9 downstream of the upstream part 10. The mixer 9 thus has a longitudinal section forming an overall "Y" shape.

However, whereas the primary flow $F_1$ runs at very high temperatures, the secondary flow $F_2$ runs at lower temperatures, which leads to a very important temperature gradient at the downstream ends 14, 15 of the upstream part 10 of the mixer 9 and the fairing 13.

Moreover, if the upstream and downstream parts 10, 12 of the mixer 9 expand under the effect of the very high temperatures of the primary flow $F_1$, this is not the case for the fairing 13, which creates very high mechanical stresses at the downstream ends 14, 15 of the upstream part 10 of the mixer 9.

Under such mechanical stresses, the fairing 13 and the mixer 9 can very soon be damaged, and it can be necessary to replace them or repair them regularly. Additionally, it becomes difficult to reach the lifetime targets required for the mixer 9.

To solve this problem, removal of the fairing 13 has been considered. This removal allows a considerable saving in weight but also has a heavy impact on the performance of the turbomachine 1 by creating a break in the aerodynamic line of the secondary flow $F_2$ at the output of the ventilation duct 63 and by limiting the ventilation of the annular structure 62.

Moreover, according to the model of turbomachine, removal of the fairing 13 cannot be considered.

There is therefore a need to increase the lifetime of the mixer 9 and of the fairing 13 in particular.

PRESENTATION OF THE INVENTION

The present invention meets this need by proposing a fairing for a mixer of a nozzle of a dual-flow turbomachine configured to be attached to the mixer at a distance from the mixing area of the primary and secondary flows.

More precisely, the subject of the present invention is a fairing for a mixer of a nozzle of a dual-flow turbomachine, said mixer being of an overall annular shape and extending along a longitudinal axis of the turbomachine, said mixer comprising an upstream part provided with a flange extending radially toward the outside of the mixer, intended to be fastened to an exhaust casing of the turbomachine, and a downstream part forming a flow mixing area, the fairing being of an overall annular shape and configured to extend around the upstream part of the mixer and to be attached to the flange of said upstream part, when said fairing is installed on the mixer, the fairing being further without means for fastening to the downstream part of the mixer, in such a way as to connect the fairing to the mixer at a distance from the flow mixing area.

Preferably, the fairing comprises an upstream portion forming a flange extending radially toward the inside of the fairing and configured to co-operate with the flange of the upstream part of the mixer, a median portion of an overall annular shape, and a downstream portion of an overall conical shape extending toward the inside of the fairing from the median portion toward a downstream end.

More preferably, the downstream end of the fairing is provided with cuts of materials intended to facilitate access to the flange of the fairing.

According to an embodiment of the invention, the fairing is configured to be attached to the flange of the upstream part of the mixer by welding. In a variant, the fairing is configured to be attached to the flange of the upstream part of the mixer by means of a bolted assembly.

Another subject of the present invention is a mixer of a nozzle of a dual-flow turbomachine, of an overall annular shape and extending along a longitudinal axis of the turbomachine, and comprising:

an upstream part provided with a flange extending radially toward the outside of the mixer and configured to be fastened to an exhaust casing of the turbomachine,
a downstream part forming a flow mixing area,
a fairing as described previously, of an overall annular shape, extending around the upstream part, being attached to the flange of the upstream part and without means for fastening to the downstream part of the mixer, in such a way as to connect the fairing to the mixer at a distance from the flow mixing area, Preferably, the downstream part ends at its downstream end in inner lobes alternating circumferentially with outer lobes, so as to encourage the mixing of the flows.

Another subject of the present invention is a dual-flow turbomachine comprising a mixer as described previously, the flange of the upstream part of said mixer being fastened to the exhaust casing.

Another subject of the present invention is an aircraft comprising at least one dual-flow turbomachine as described previously.

OVERVIEW OF THE FIGURES

Figure 2:
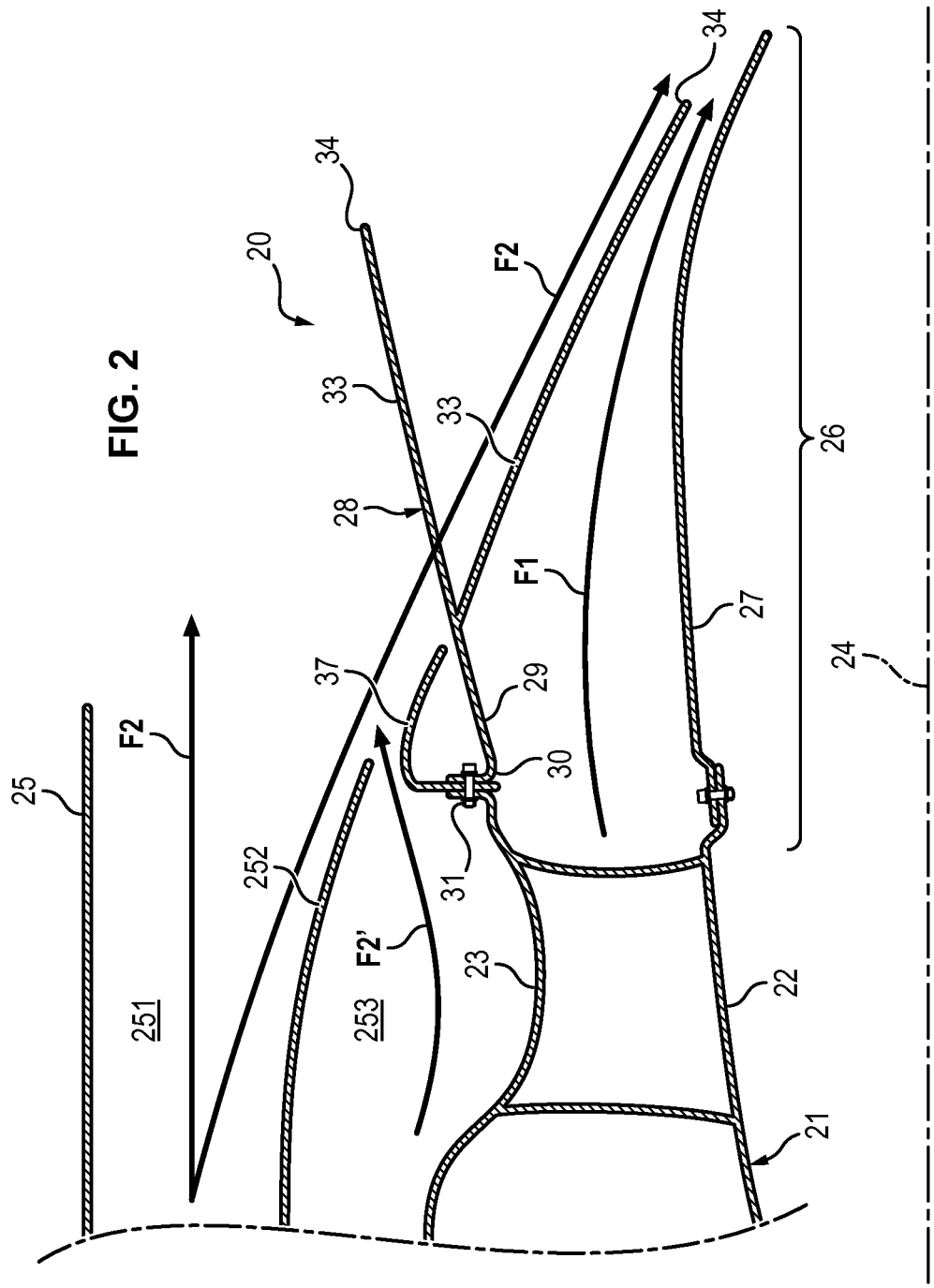
Figure 3:
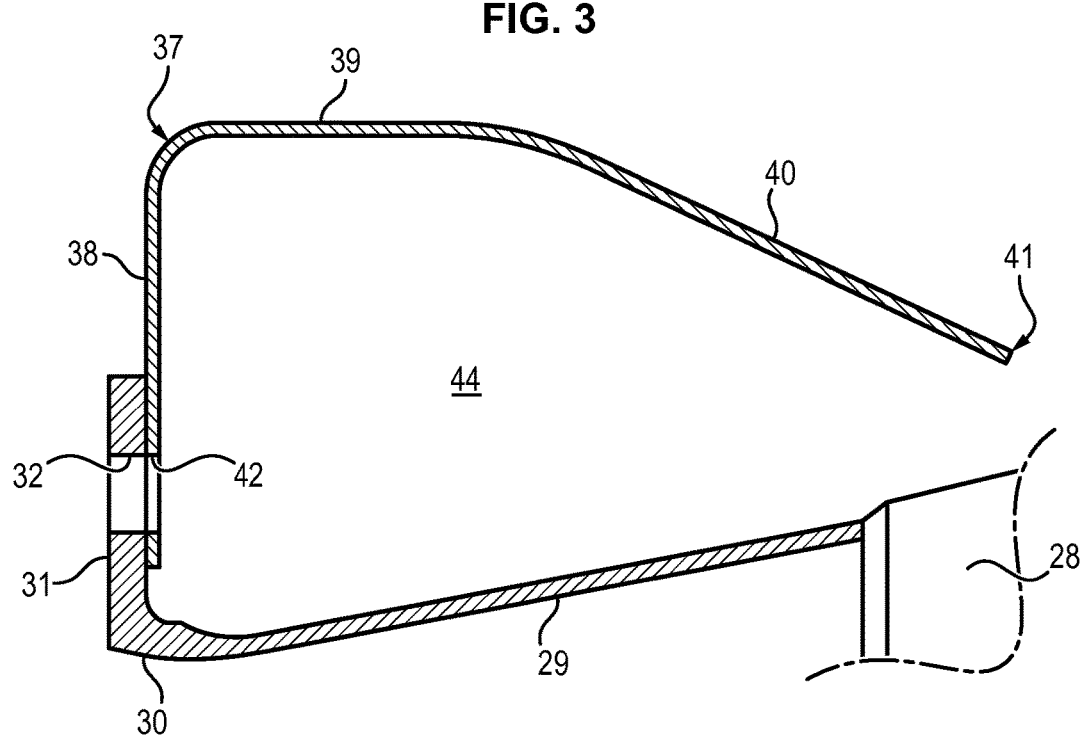
Figure 4:
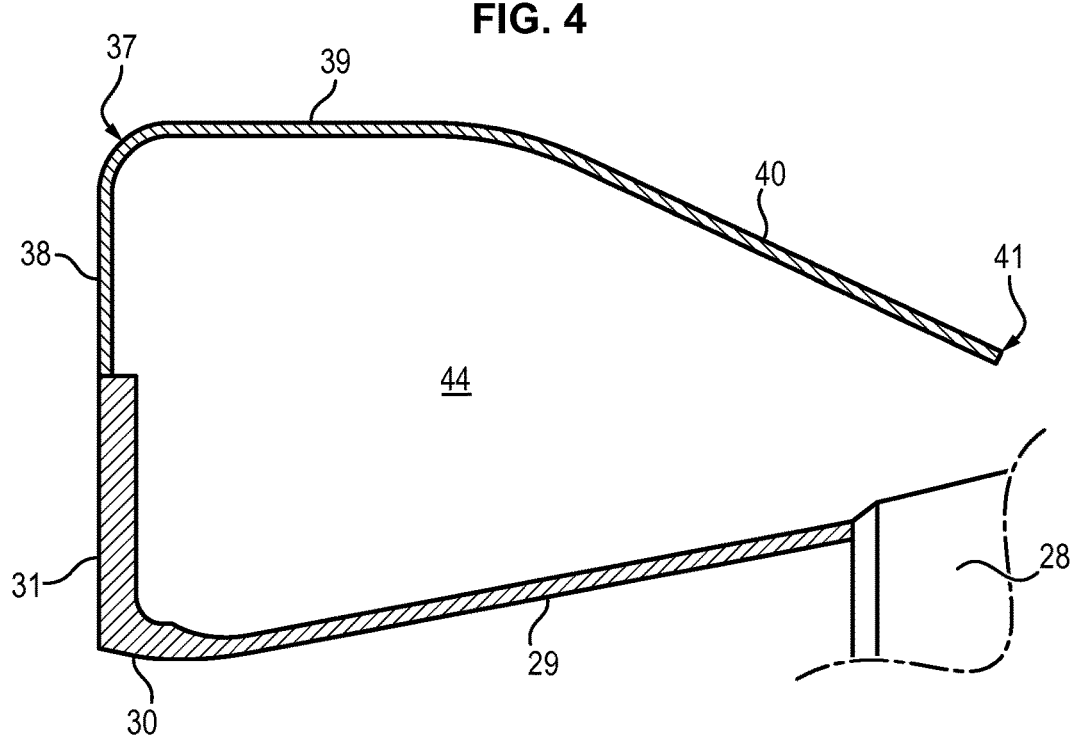
Figure 5:
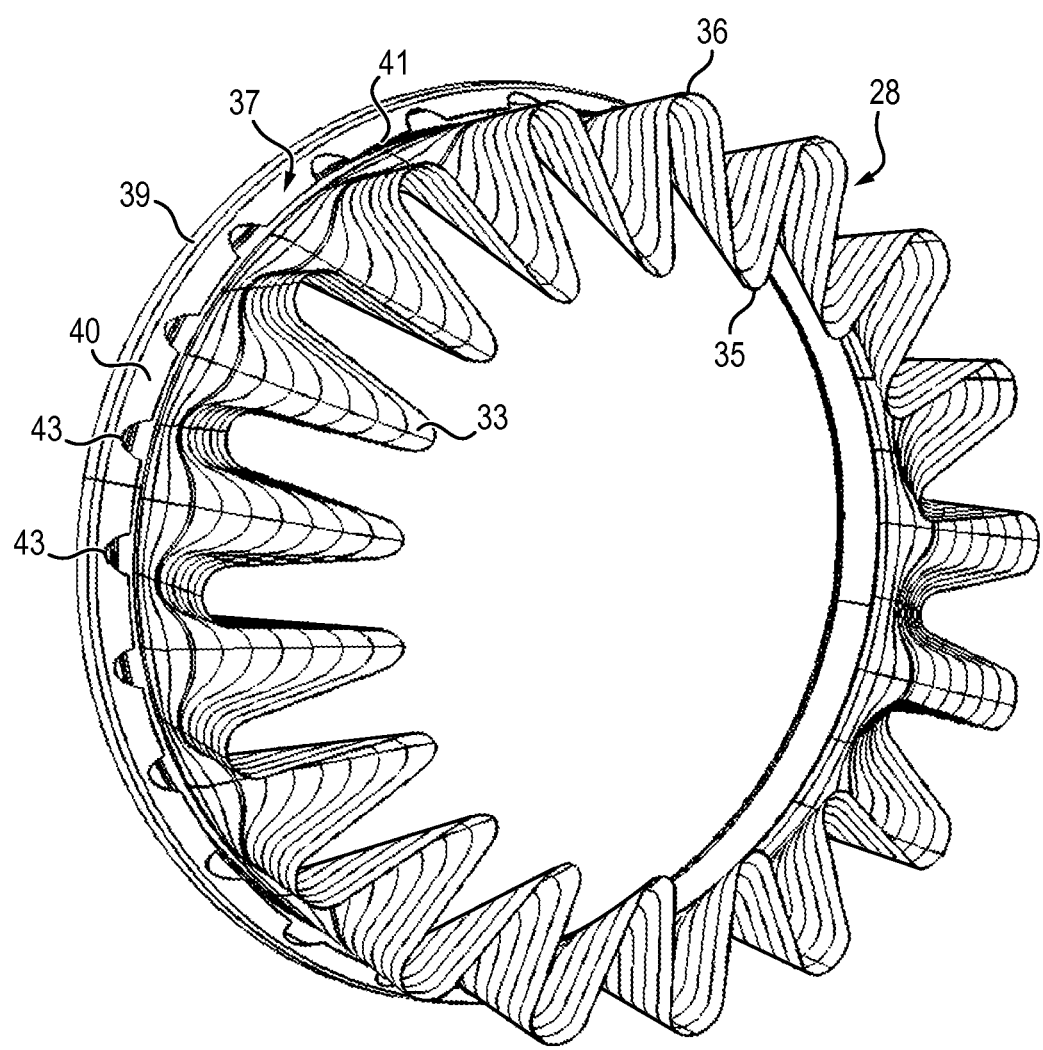
Figure 6:
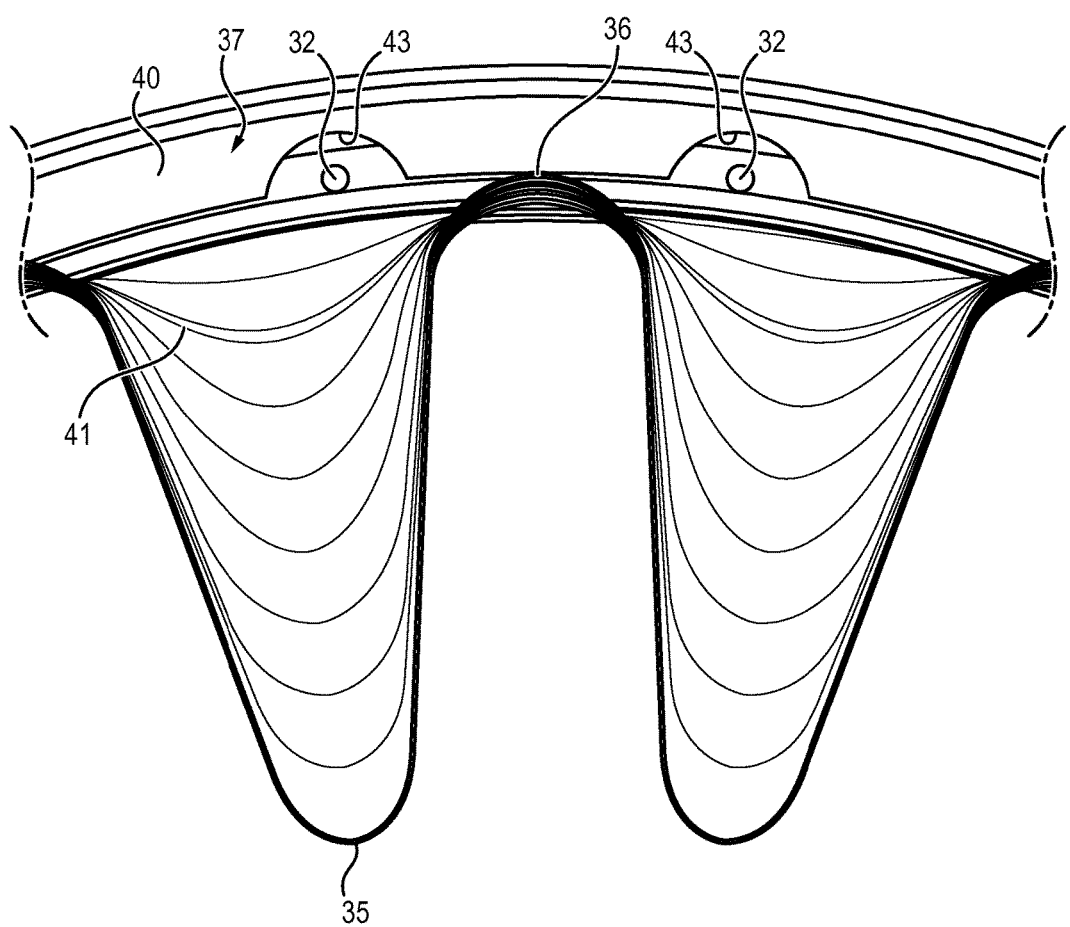

Other features, aims and advantages of the present invention will become apparent on reading the following detailed description, with reference to the appended drawings given by way of non-limiting example and wherein:

FIG. 1 (already described) is a schematic view, in section, of a confluent flow nozzle of the prior art, FIG. 2 is a schematic view, in section, of a nozzle of a dual-flow turbomachine comprising a mixer provided with a fairing according to an embodiment of the invention, FIG. 3 is a detailed view, in section, of the fairing illustrated in FIG. 2, Ia FIG. 4 is a detailed view, in section, of a fairing according to another embodiment than that illustrated in FIG. 4, FIG. 5 is a perspective view of the mixer provided with the fairing illustrated in FIGS. 2 and 3, FIG. 6 is a detailed view of the downstream of the mixer illustrated in FIG. 5.

DETAILED DESCRIPTION

FIG. 2 represents a longitudinal section view of a dual-flow turbomachine 20 according to an embodiment of the invention.

The turbomachine 20 comprises an exhaust casing 21 delineated by annular inner and outer casings 22 and 23, extending one inside the other along a longitudinal axis 24 of the turbomachine 20, and between which a primary flow $F_1$ of gas runs. The exhaust casing 21 is surrounded by a nacelle 25 that forms with the outer casing 23 a duct 251 along which a secondary flow $F_2$ of gas runs. The exhaust casing 21 is further surrounded by an annular structure 252 provided between the nacelle 25 and the outer casing 23 so as to derive a part $F_2'$ of the secondary flow $F_2$ toward a ventilation duct 253 formed between the outer casing 23 and the annular structure 252. This derived part $F_2'$ of the secondary flow $F_2$ is generally described as a ventilation flow of the nacelle 25.

Downstream, the exhaust casing 21 is connected to an exhaust nozzle 26.

The exhaust nozzle 26 comprises a central body 27 or "plug" extending along the longitudinal axis 24 and having a downstream end of an overall conical shape. The central body 27 is connected to the inner casing 22.

The exhaust nozzle 26 further comprises a mixer 28 of an overall annular shape, extending along the longitudinal axis 24.

The mixer 28 comprises an upstream part 29 at the level of which the ventilation duct 253 sends the ventilation flow $F_2'$ back into the duct 251 into which the secondary flow $F_2$ runs. The upstream part 29 of the mixer 28 is fitted at an upstream end 30 with a flange 31 extending radially toward the outside of the mixer 28 and by which the mixer 28 is connected to the outer casing 23. The flange 31 is for example provided with holes 32 intended to receive bolted assemblies so as to ensure the connection of the mixer 28 with the exhaust casing 21.

The mixer 28 further comprises a downstream part 33 forming an area where the primary $F_1$ and secondary flow $F_2$ mix. In the example illustrated in FIGS. 2 to 6, the downstream part 33 terminates at its downstream end 34 in inner lobes 35 alternating circumferentially with outer lobes 36, so as to encourage the mixing of the primary $F_1$ and secondary $F_2$ flows.

The mixer 28 is also provided with a fairing 37 of an overall annular shape extending along the longitudinal axis 24 around the upstream part 29 of the mixer 28 and configured to ensure continuity of the secondary flow $F_2$ at the output of the ventilation duct 253. In other words, the fairing 37 makes it possible to avoid a break in the aerodynamic line of the secondary flow $F_2$ at the output of the ventilation duct 253, when the ventilation flow $F_2'$ is sent back into the duct 251 and comes to mix with the secondary flow $F_2$. The fairing 37 furthermore encourages the ventilation of the annular structure 252.

The fairing 37 is attached to the flange 31 of the upstream part 29. Furthermore, the fairing 37 is without means for fastening to the downstream part 33. Thus, the fairing 37 is connected to the mixer 28 at a distance from the mixing area of the primary $F_1$ and secondary $F_2$ flow. Specifically, the physical connection between the fairing 37 and the upstream part 29 is no longer made in the area of the mixer 28 having the strongest thermal gradient, but in an area having a lower thermal gradient insofar as the flange 31 of the upstream part 29 extends radially toward the outside of the mixer 28 and is therefore not directly in contact with the primary flow $F_1$. Additionally, the mechanical stresses generated by the expansion of the upstream and downstream parts 29, 33 of the mixer 28 are reduced. The lifetime of the mixer 33 and the fairing 37 is therefore greatly improved thereby. Moreover, such a solution also makes it possible to reduce the thickness of the fairing 37 and of the upstream part 29 of the mixer 28 so as to achieve a weight saving.

More precisely and as illustrated in FIGS. 3 and 4, the fairing 37 comprises an upstream portion 38 forming a flange extending radially toward the inside of the mixer 28 and co-operating with the flange 31 of the upstream part 29 of said mixer 28, a median portion 39 of an overall annular shape, and a downstream portion 40 of an overall conical shape extending toward the inside of the mixer 28 from the median portion 39 toward a downstream end 41 of the fairing 37. Thus, the fairing 37 makes it possible to ensure the continuity of the secondary flow $F_2$ at the output of the ventilation duct 253.

In the example illustrated in FIG. 3, the flange 38 of the fairing 37 is provided with holes 42 extending coaxially with the holes 32 of the flange 31 of the upstream part 29 of the mixer 28. Thus it is possible to use the same bolted assemblies to attach the fairing 37 to the mixer 28 and to fasten the mixer 28 to the exhaust casing 23. In addition, the fairing 37 can be added to an existing configuration of mixer 28 without any effect on the method of fabrication of said mixer 28. In this case, before assembling the mixer 28, the fairing 37 can for example appear in the shape of two semi-circles that bear against one another around the upstream part 29 of the mixer 28 by radial translation. These two semi-circles can optionally be subsequently fastened together by way of a bolted connection. In the example illustrated in FIG. 3, the flange 38 of the fairing 37 is positioned downstream of the flange 31 of the upstream part 29, but can just as well be positioned upstream of said flange 31.

In a variant illustrated in FIG. 4, the flange 38 of the fairing 37 is attached to the flange 31 of the upstream part 29 by welding. In this case, the inner diameter of the flange 38 of the fairing 37 is substantially equal to the outer diameter of the flange 31 of the upstream part 29. It is then possible to arrange the fairing 37 around the upstream part 29 by translation along the longitudinal axis 24.

The downstream end 41 can be further provided with cuts of material 43, forming semi-circles for example, intended to facilitate access to the holes 32 of the flange 31 of the upstream part 29. Advantageously, the cuts of material 43 are provided coaxially with the holes 32 of the flange 31 of the upstream part 29. These cuts of material 43 are illustrated in FIGS. 5 and 6 in particular.

As the fairing 37 forms with the upstream part 29 an area 44 for retaining oil or water for example, an orifice can also be provided in the median portion 39 of the fairing 37, in the lower position of said fairing 37, to ensure the draining of the retaining area 44.

The invention claimed is:

1. A fairing for a mixer of an exhaust nozzle of a dual-flow turbomachine, wherein a first flow is between an inner body of the exhaust nozzle and the mixer, and a second flow is radially outward of the mixer, said mixer being of an overall annular shape and extending along a longitudinal axis of the turbomachine, said mixer comprising an upstream part provided with a flange extending radially outwards of the mixer, intended to be fastened to an exhaust casing of the turbomachine, and a downstream part forming a flow mixing area radially outwards of the fairing between the fairing and the mixer, the fairing being of an overall annular shape and configured to extend around the upstream part of the mixer at a distance from the flow mixing area, said fairing being characterized in that it is configured to be attached to the flange of the upstream part of the mixer, when said fairing is installed on the mixer, and in that it is without means for fastening to the downstream part of the mixer.

2. The fairing according to claim 1, comprising an upstream portion forming a flange of the fairing extending radially inwards of the fairing and configured to co-operate with the flange of the upstream part of the mixer, a median portion of an overall annular shape, and a downstream portion of an overall conical shape extending radially inwards of the fairing from the median portion toward a downstream end.

3. The fairing according to claim 2, wherein the downstream end of the fairing is provided with cuts of material intended to facilitate access to the flange of the fairing.

4. The fairing according to claim 1, wherein the fairing is configured to be attached to the flange of the upstream part of the mixer by welding.

5. The fairing according to claim 1, wherein the fairing is configured to be attached to the flange of the upstream part of the mixer by means of a bolted assembly.

6. A mixer of an exhaust nozzle of a dual-flow turbomachine, wherein a first flow is between an inner body of the exhaust nozzle and the mixer, and a second flow is radially outward of the mixer, the mixer being of an overall annular shape and extending along a longitudinal axis of the turbomachine, said mixer comprising:
an upstream part provided with a flange extending radially outwards of the mixer and configured to be fastened to an exhaust casing of the turbomachine,
a downstream part forming a flow mixing area,
said mixer being characterized in that it comprises a fairing, of an overall annular shape, extending around the upstream part of the mixer at a distance from the flow mixing area, said fairing being attached to the flange of the upstream part of the mixer and without means for fastening to the downstream part of the mixer, wherein the flow mixing area is formed radially outwards of the fairing between the fairing and the mixer.

7. The mixer according to claim 6, wherein the downstream part ends at its downstream end in inner lobes alternating circumferentially with outer lobes, so as to encourage mixing of the first flow and the second flow.

8. A dual-flow turbomachine comprising the mixer according to claim 6, the flange of the upstream part of said mixer being fastened to the exhaust casing.

9. An aircraft comprising at least the dual-flow turbomachine according to claim 8.

\* \* \* \* \*